United States Patent
Chen et al.

(10) Patent No.: US 6,618,442 B1
(45) Date of Patent: Sep. 9, 2003

(54) METHOD AND APPARATUS FOR TRANSCODING DIGITAL VIDEO SIGNALS

(75) Inventors: George K. Chen, Portland, OR (US); Atul Gupta, Portland, OR (US); Michael Keith, Salem, OR (US); Jeffery S. McVeigh, Portland, OR (US); Stephen V. Wood, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/239,863

(22) Filed: Jan. 29, 1999

Related U.S. Application Data

(63) Continuation-in-part of application No. 09/221,850, filed on Dec. 29, 1998.

(51) Int. Cl.[7] .............. H04B 1/66; G06K 9/36; H04N 7/12
(52) U.S. Cl. .................. 375/240.2
(58) Field of Search ............ 375/240.01, 240.16, 375/240.2, 240.25, 240.12, 240.03, 240.21, 240.15, 243, 245; 348/393.1, 397.1, 441, 454, 455; 341/51; 382/236

(56) References Cited

U.S. PATENT DOCUMENTS

| | | | | |
|---|---|---|---|---|
| 5,537,440 A | * | 7/1996 | Eyuboglu et al. | 375/240.03 |
| 5,708,473 A | * | 1/1998 | Mead | 348/699 |
| 5,870,146 A | * | 2/1999 | Zhu | 375/240 |
| 5,940,130 A | * | 8/1999 | Nilsson et al. | 375/240.12 |
| 6,081,211 A | * | 6/2000 | de Queiroz et al. | 341/51 |
| 6,141,447 A | * | 10/2000 | Linzer et al. | 382/236 |
| 6,195,390 B1 | * | 2/2001 | Hashino et al. | 375/240.21 |

OTHER PUBLICATIONS

"Transcoding DV into MPEG–2 in the DCT domain," Spie vol. 3653, Jan. 1999, Donyeon Kim, Bumsik Youn, and Yoonsik Choe.

* cited by examiner

Primary Examiner—Gims S. Philippe
(74) Attorney, Agent, or Firm—Kenyon & Kenyon

(57) ABSTRACT

A method and apparatus for transcoding a digital video signal is described. A first set of bits encoded in a first encoding format are received. The first set of bits are decoded to discrete cosine transform (DCT) coefficients. The DCT coefficients are transformed into an intermediate exchange format. The transformed DCT coefficients are encoded using a second encoding format.

19 Claims, 6 Drawing Sheets

METHOD AND APPARATUS FOR TRANSCODING DIGITAL VIDEO SIGNALS

This is a continuation-in-part of application Ser. No. 09/221,850 filed Dec. 29, 1998, the entire content of which is incorporated here by reference.

FIELD OF THE INVENTION

The invention relates to video processing in general. More particularly, the invention relates to a method and apparatus for transcoding Digital Video (DV) signals to Motion Picture Experts Group (MPEG) signals for storage on a Digital Versatile Disc (DVD).

BACKGROUND OF THE INVENTION

Digital video is becoming increasingly popular because of its capability of delivering high picture quality. One problem with digital video, however, is the amount of digital data which is necessary to represent an image with high levels of detail. This in turn creates problems with storing the digital data, and transporting the digital data between individual devices (e.g., from one computer to another over a network). Consequently, various compression technologies have been developed to reduce the amount of digital data necessary to represent analog video signals, while still maintaining the high levels of quality associated with digital video. One such compression technology was introduced by Sony Corporation titled "Specifications of Consumer-use Digital VCRs using 6.3 mm magnetic tape," December 1994, HD Digital VCR conference ("DV standard").

While the DV standard helps reduce the amount of digital data necessary to represent a video signal, a recent technology has emerged which permits larger amounts of digital data to be stored on an optical disc having the size of a conventional Compact Disc (CD). This new technology is referred to as Digital Versatile Disc (DVD), and provides the capability of storing up to 4.7 Gigabytes of data per disc. This represents a significant increase over previous storage techniques. DVD thus offers a desirable medium for storing digital video in general, and DV encoded signals in particular.

A problem occurs, however, while attempting to store DV encoded video signals to DVD media. DVD is only capable of storing digital video signals compressed according to a particular compression standard such as the International Standards Organization/international ElectroTechnical Committee (ISO/IEC) Motion Picture Expert Group Two (MPEG-2) 13818-2, titled "Information technology—Generic coding of moving pictures and associated audio information: Video," 1994. Consequently, the DV encoded signal must first be decoded using a DV decoder, and then re-encoded using an MPEG encoder, prior to being stored on DVD media. The process of re-encoding a video signal is often referred to as "transcoding."

Conventional DV to MPEG transcoding techniques are unsatisfactory for a number of reasons. First, conventional transcoders require that the DV encoded signal be decoded to the spatial domain (e.g., a set of 8×8 pixel or "PEL" values from a video frame) represented by some arbitrary intermediary format such as "RGB". RGB is a color model in which colors are specified as intensities (between 0.0 and 1.0, if floating point representation is used, or between 00 and 0xFF for 8-bit integer hex representation) of the three CRT monitor primary colors: red, green, and blue. The pixel values are then re-encoded in accordance with the MPEG standard. The need to reduce the DV encoded signal to the spatial domain, however, is time consuming and expensive in terms of processing cycles. This prevents DV encoded signals from being recorded to DVD in real-time or near real-time. Further, it increases the overall cost of the transcoder, since large amounts of memory are necessary to buffer the DV encoded signals while the transcoding process is being performed.

In view of the foregoing, it can be appreciated that a substantial need exists for a new video transcoder which solves the above-discussed problems.

SUMMARY OF THE INVENTION

One embodiment of the invention comprises a method and apparatus for transcoding a digital video signal. A first set of bits encoded in a first encoding format are received. The first set of bits are decoded to discrete cosine transform (DCT) coefficients. The DCT coefficients are transformed into an intermediate exchange format. The transformed DCT coefficients are encoded using a second encoding format.

DETAILED DESCRIPTION

The embodiments of the invention include a method and apparatus for transcoding DV encoded signals to MPEG encoded signals for storage on DVD media. The embodiments are described herein in terms of a software based DV to MPEG transcoder running on a conventional personal computer (PC). The software based DV to MPEG transcoder described herein is superior to conventional transcoders in that it avoids the necessity of decoding the DV encoded signal to the spatial domain prior to performing MPEG encoding. This permits the embodiments of the invention to transcode DV encoded signals to MPEG encoded signals fast enough to allow the DV encoded signals to be stored on DVD media in real-time or near real-time. This creates large savings in DVD media creation time, as well as reduces the amount of hard-drive space and memory requirements of the PC, since only a nominal buffering of data is needed. This savings can be significant, as the DV bitstream requires 3.6 megabytes per second (MBps) of video, or 6.5 gigabytes for 30 minutes.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
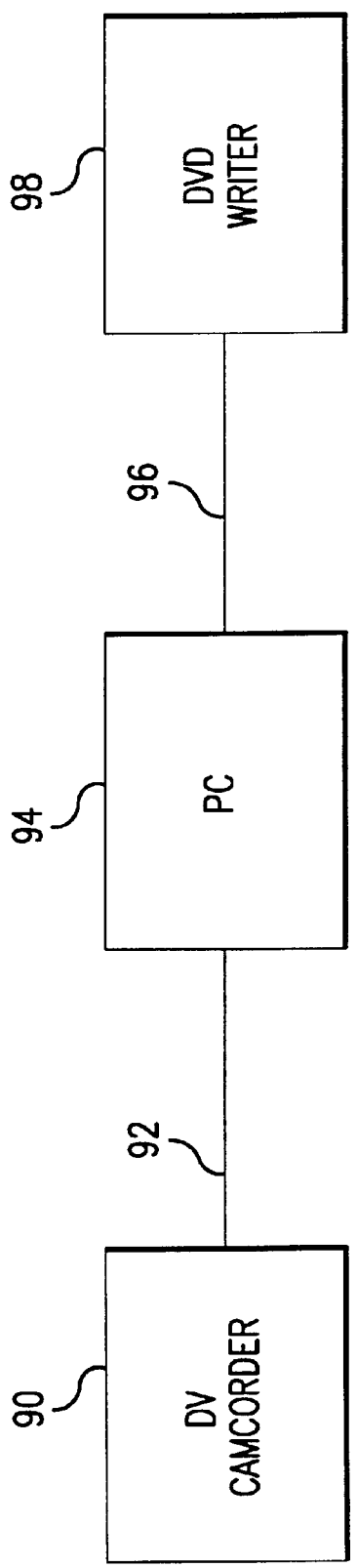
FIG. 1 a video system suitable for practicing one embodiment of the invention.

Referring now in detail to the drawings wherein like parts are designated by like reference numerals throughout, there is illustrated in FIG. 1 a video system suitable for practicing one embodiment of the invention. The video system comprises a video camera or camcorder 90 connected to a PC 94 via a communication link 92. PC 94 is in turn connected to a DVD writer 98 via a communication link 96.

In operation, DV encoded signals originate at camcorder 90, and are sent over link 92 to PC 94. In this embodiment of the invention, the signals are sent over link 92 in accordance with, for example, the Institute of Electrical and Electronics Engineers (IEEE) Standard 1394 titled "IEEE Standard for a High Performance Serial Bus," IEEE Computer Society, Dec. 12, 1995 ("IEEE 1394"). A software based transcoder runs on the PC's central processing unit (CPU), which converts the DV encoded signals into MPEG-2 encoded signals. The MPEG-2 encoded signals are sent over connection 96 to DVD writer 98, where the MPEG-2 encoded signals are written onto DVD media.

The entire process described above is designed to occur in real-time, enabling live recording of DVD media. Systems having potential limitations in terms of CPU performance, input/output speed or DVD media writer speed may cause additional components to be needed. These include buffering of input and/or output data, and camera control to start and stop DV input feed.

Figure 2:
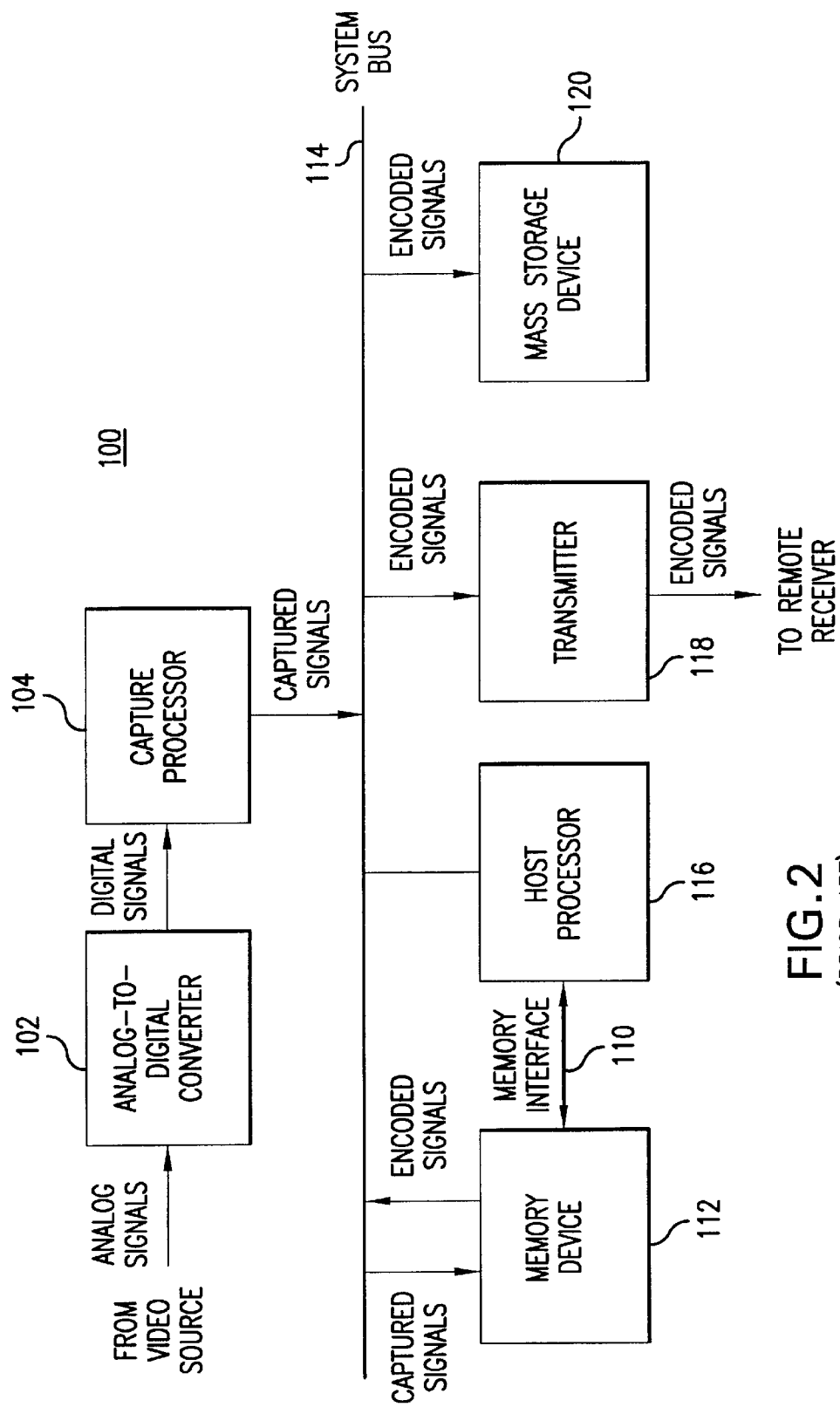
FIG. 2 is a block diagram of an encoding system suitable for use with one embodiment of the invention.

FIG. 2 is a block diagram of an encoding system suitable for use with one embodiment of the invention. An encoding system 100 includes an analog-to-digital (A/D) converter 102 that receives analog video signals from a video source. The video source may be any suitable source of analog video signals such as camcorder 90 or video camera recorder (VCR) for generating local analog video signals or a video cable or antenna for receiving analog video signals from a remote source. A/D converter 102 decodes (ie, separates the signal into constituent components) and digitizes the analog video signals into digital video component signals.

Capture processor 104 captures the digitized component signals received from converter 102. Capturing may include one or more of color conversion, scaling, and subsampling. Capture processor 104 selectively stores the captured signals to memory device 112 and/or mass storage device 120 via system bus 114. Those skilled in the art will understand that, for real-time encoding, the captured signals are preferably stored to memory device 112, while for non-real-time encoding, the captured signals are preferably stored to mass storage device 120.

During real-time encoding, host processor 116 reads the captured bitmaps from memory device 112 via high-speed memory interface 110 and generates encoded video signals that represent the captured video signals. Host processor 116 applies a sequence of compression steps in accordance with one of a variety of standards, such as the DV standard, to reduce the amount of data used to represent information in the video signals. For exemplary purposes only, the compression steps used by encoding system 100 adhere to those set forth in the DV standard.

Once video signals are DV encoded, the DV encoded video signals are then stored to memory device 112 via memory interface 112 and/or mass storage device 120 via system bus 114. Host processor 116 may copy the encoded video signals to mass storage device 120 and/or transmit the encoded video signals to transmitter 118 for real-time transmission to a remote device, such as PC 94 (shown in FIG. 1).

Figure 3:
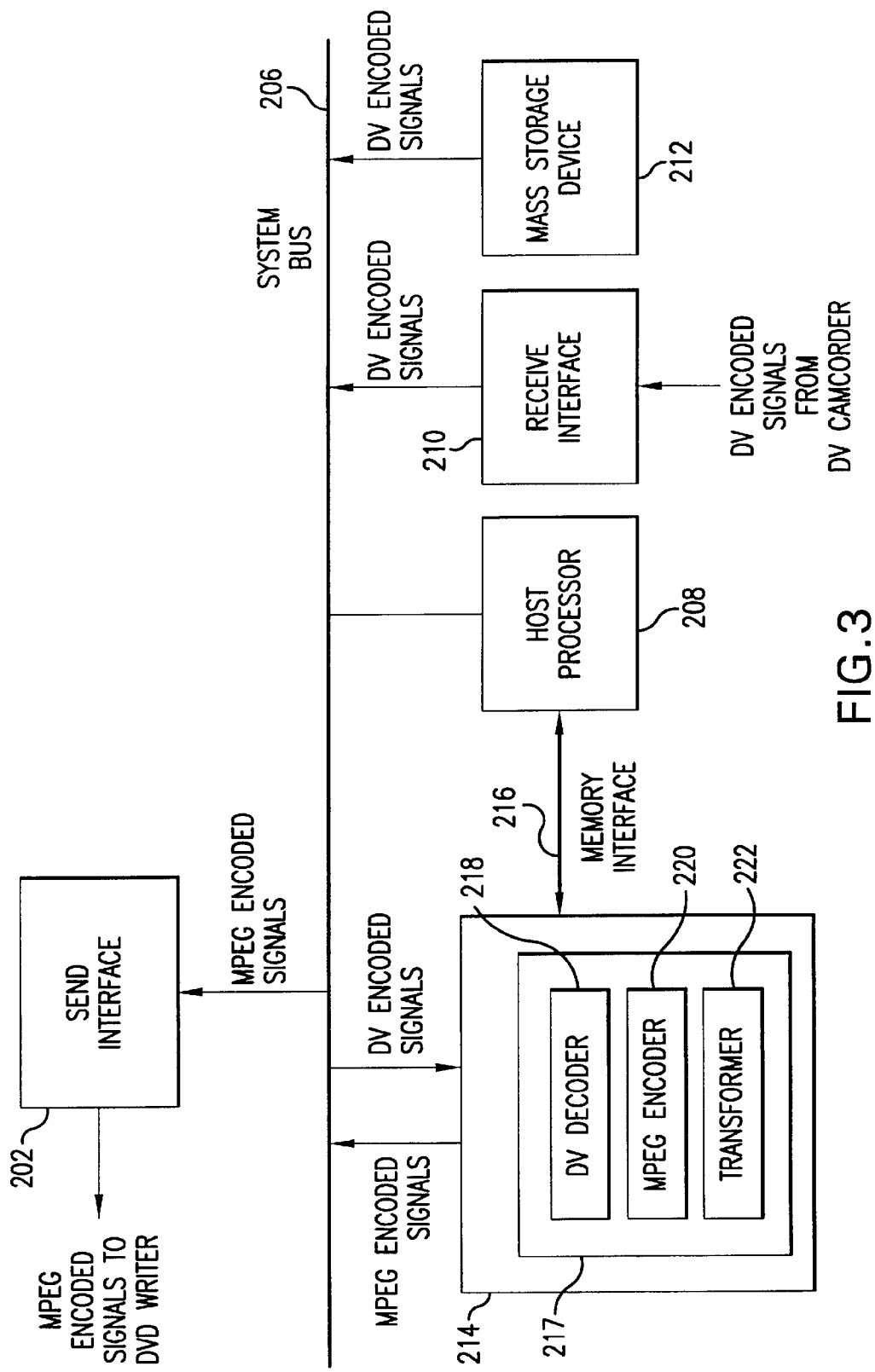
FIG. 3 illustrates a system for transcoding DV encoded video signals to MPEG encoded video signals according to one embodiment of the present invention.

FIG. 3 illustrates a system for transcoding DV encoded video signals to MPEG encoded video signals according to one embodiment of the present invention. A system 200 comprises a host processor 208, a receive interface 210, a mass storage device 212, a memory 214, and a send interface 202, each of which is connected to a system bus 206. System 200 also includes a memory interface 216 for retrieving program code and data from memory 214.

Memory device 214 stores a transcoder module 217. Transcoder module 217 comprises a DV decoder module 218, an MPEG encoder module 220 and a transformer module 222. In this embodiment of the invention, transcoder 217 is comprised of computer program segments that are stored in memory 214, which when executed by a processor (e.g., processor 208), implements the DV to MPEG transcoding functionality described in more detail below with reference to FIG. 6. It is noted that modules 217, 218 and 220 are shown as separate modules. It can be appreciated, however, that the functions performed by these modules can be further separated into more modules, combined to form a single module, or be distributed throughout the system, and still fall within the scope of the invention. Further, the functionality of this module may be implemented in hardware, software, or a combination of hardware and software, using well-known signal processing techniques.

It can further be appreciated that the particular configuration shown in FIGS. 1 and 2 are chosen as an example only and is not limitive of the type of systems on which the present invention can work. The number of configurations that video systems can take are virtually limitless and techniques for setting up these configurations are well known to those skilled in the art. The present invention can operate on any of these possible configurations.

Prior to describing the embodiments of the invention, a brief description of the DV decoding and the MPEG encoding processes is presented. The key differences between the DV decoding standard and the MPEG encoding standard (also referred herein as "formats"), are also summarized.

According to the DV standard, all frames within the DV sequence are intra-coded, i.e., each frame is decoded independently of the other frames in the sequence. While this I frame only representation aids random access and error resiliency capabilities, coding efficiency suffers because the temporal redundancy within the sequence is not exploited.

The DV encoded signal has the following data structure. The DV encoded signal (or "bitstream") is structured hierarchically. The lowest level of the hierarchy is the block, which consists of a contiguous region of 8×8 pixels. A macroblock consists of 4 luminance blocks and 2 chrominance (Cb and CR) blocks. A superblock consists of twenty-seven spatially adjacent macroblocks. A video segment contains the compressed representation of five, non-adjacent macroblocks from five superblocks. Finally, the DV frame consists of 50 video segments. An important point to note from this structure is that the macroblock data is interleaved within the compressed frame.

The color format for DV encoded signals depends on the type of system used. In national television system committee (NTSC) systems, the chrominance format is 4:1:1, which implies that the chrominance signals are subsampled by 4 horizontally with respect to the luminance signal. In phase alternating line (PAL) systems, the chrominance format is 4:2:0, which implies that the chrominance is subsampled by 2 both horizontally and vertically.

Figure 4:
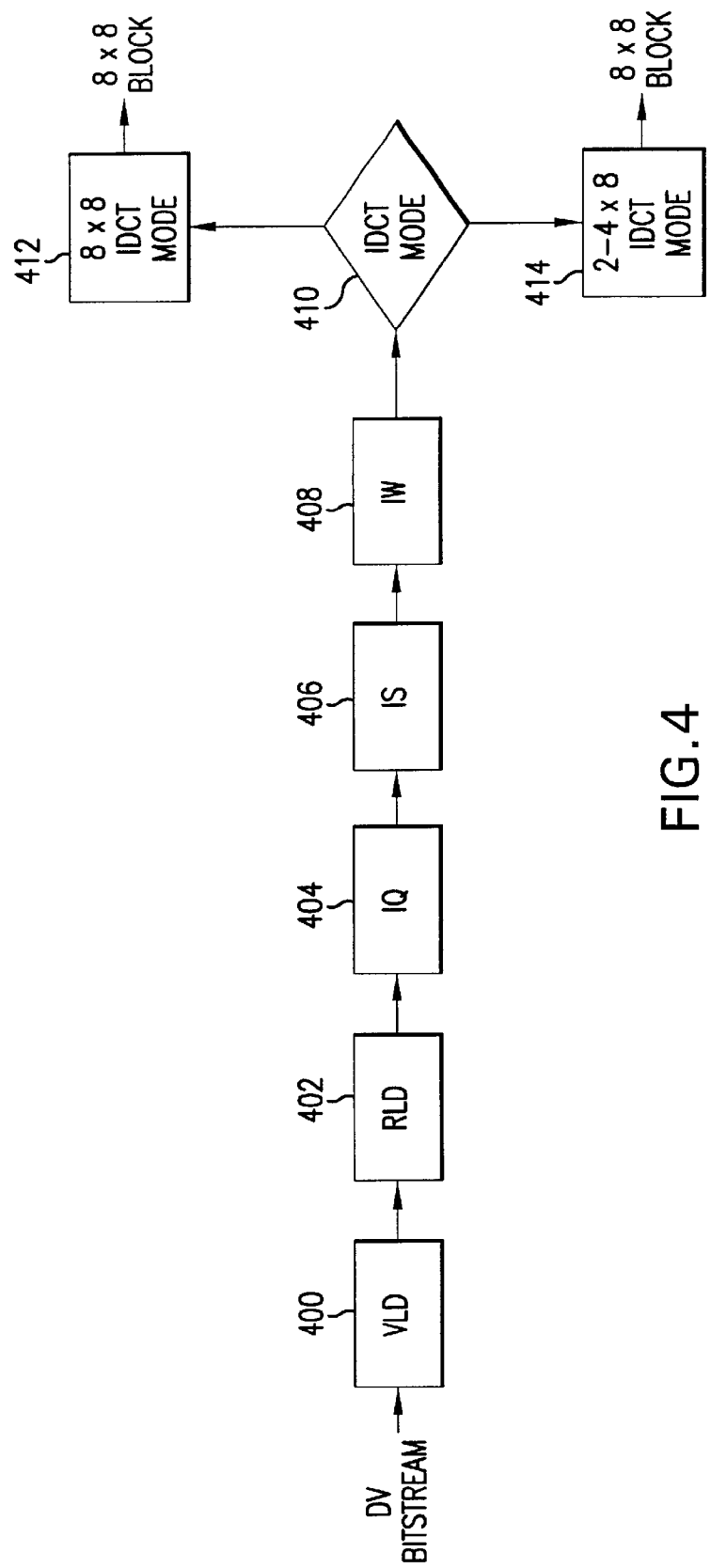
FIG. 4 is a block flow diagram of a conventional DV decoding process.

FIG. 4 is a block flow diagram of the steps performed by a conventional DV decoding process. The DV decoding process is performed one video segment at a time. The process begins at step 400 with the variable length decoding (VLD) of the five macroblocks within the video segment. This entails parsing the macroblock header along with the discrete cosine transform (DCT) coefficients. Run-length decoding (RLD) is performed at step 402, which converts the sequence of non-zero AC coefficients for the five macroblocks into the appropriate DCT data blocks. The AC coefficients are inverse quantized (IQ) and inverse scaled (IS) at steps 404 and 406, respectively. Next, both the AC and DC coefficients are inverse weighted at step 408. Finally, inverse DCT (IDCT) is performed to transform the coefficient data into pixel values. A test is made to determine the DCT mode used to encode the video signals at step 410.

There are two types of IDCT processes, namely the 8×8 IDCT and 2–4×8 IDCT. If 8×8 DCT encoding was utilized in creating the DV encoded signal, the 8×8 IDCT is performed at step 412. If the 2–4×8 DCT encoding was utilized, however, the 2–4×8 IDCT process is performed at step 414. Both modes yield an 8×8 block of pixel values.

It is worthy to note that for performance reasons, the inverse quantization, scaling and weighting stages may be combined into a single multiplication operation. Also, since many of the compressed DCT coefficients are zero, this process only needs to be performed on non-zero coefficients parsed within the VLD stage.

MPEG-2 supports I, P and B frame types. As in DV, the I frames are used to aid random access and error resiliency capabilities. The P and B frames improve compression efficiency by exploiting temporal redundancy in the video sequence. This is achieved by predicting the current frame from previously decoded reference frames using motion compensation. Only the error between the current and predicted frames then needs to be encoded, which typically has much lower entropy than the original frame.

As with the DV data structure, the MPEG-2 bitstream is also structured hierarchically. The lowest level of the hierarchy is the block, which consists of a contiguous region of 8×8 pixels. A macroblock consists of 4 luminance blocks and 2 chrominance (Cb and Cr) blocks. A slice consists of a set of macroblocks arranged in raster-scan order. A frame contains the non-overlapping slices that cover the entire picture data.

When stored on a DVD, the chrominance format in MPEG-2 bitstreams is always 4:2:0, regardless of the video format. This implies that the chrominance signals (Cb and Cr) are subsampled by 2 both horizontally and vertically with respect to the luminance signal.

Figure 5:
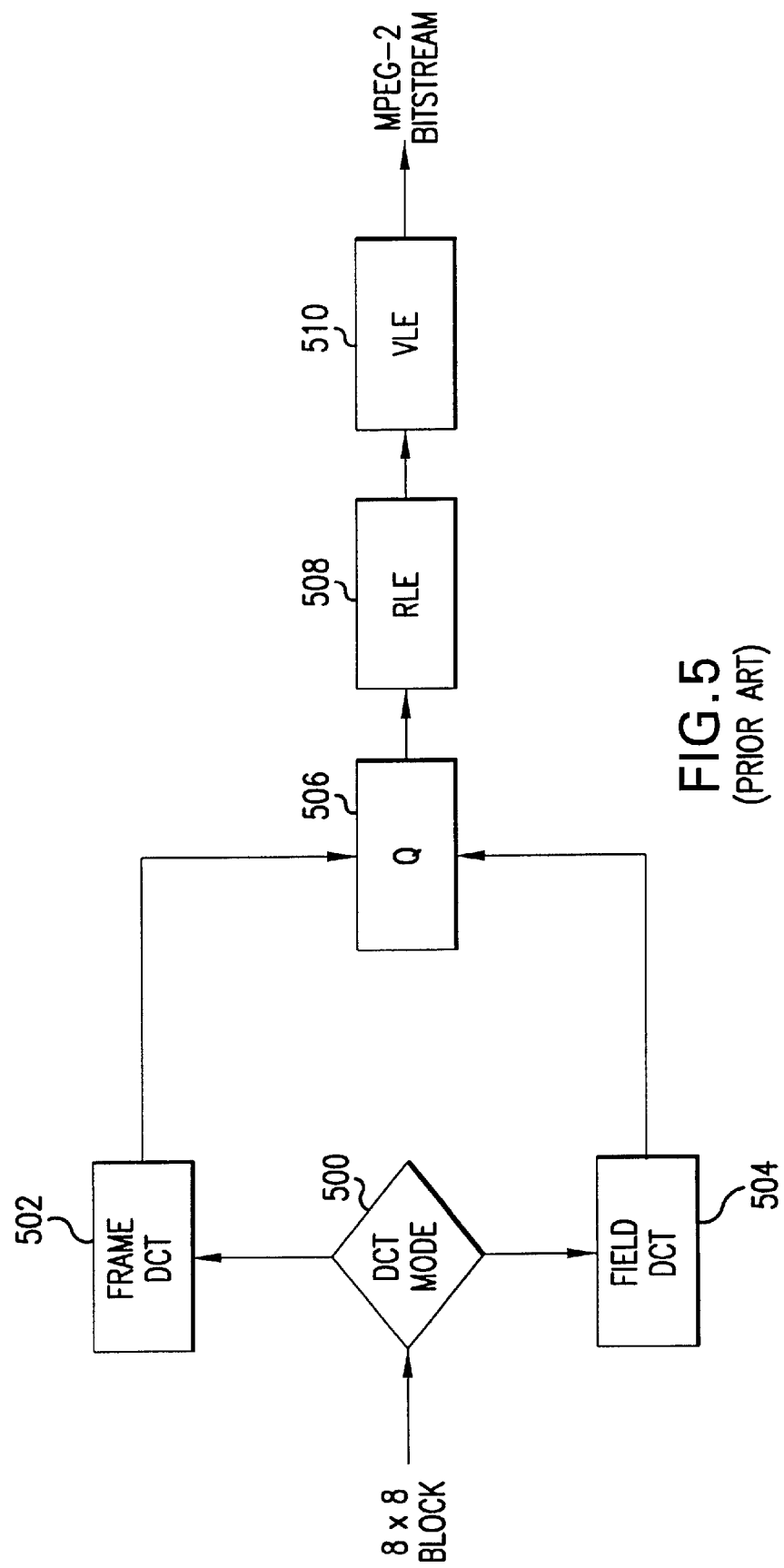
FIG. 5 is a block flow diagram of a conventional MPEG encoding process.

FIG. 5 is a block flow diagram of the steps performed in a conventional MPEG encoding process. The MPEG-2 encoding process is performed one macroblock at a time. For I frames, the first step is to transform the spatial pixel values of each block into the generalized frequency domain using an 8×8 DCT. This 8×8 DCT is identical to that used in the DV decoding process, except luminance blocks may use either frame or field DCT. Thus, at step 500, a test of which DCT mode is to be used. If the DCT mode is frame DCT, frame DCT is performed at step 502, otherwise field DCT is performed at step 504. The DCT coefficients are then quantized (Q) using a pre-defined quantization matrix at step 506. This quantization process is not equivalent to the weighing, scaling and quantization stages of DV. Finally, the quantized coefficients are run-length encoded (RLE) at step 508 and variable-length encoded (VLE) at step 510, to produce an MPEG-2 bitstream.

If the I frame is to be used for the prediction of a subsequent frame (e.g., if there are P or B frames in the sequence), the I frame data should be decoded and stored in memory (e.g., memory 214). Reconstruction maintains synchronization between the encoder's and decoder's reference frames.

The encoding process for macroblocks within P and B frames begins with a motion estimation (ME) step to find the best prediction of the current macroblock within the reference frame(s). The output of the ME process is a motion vector, which describes the offset from the current macroblock location to its prediction. After ME, it is customary to decide whether the macroblock should be intra or inter-coded. If intra-coding is selected, the encoding process for the macroblock is identical to macroblocks within I frames. If inter-coding is selected, motion compensation is performed to generate the prediction from the motion vector(s) and reference frame(s). The error, or residual, between the original and predicted macroblocks is then calculated, and this data is passed through the common DCT, quantization, run-length and variable length encoding stages. Again, if the P frame is to be used for the prediction of a subsequent frame, it should be decoded and stored at the encoder. However, B frames never need to be decoded since they are not used in the prediction of other frames.

The following Table 1 summarizes the differences between the DV and MPEG-2 compression formats.

TABLE 1

| Feature | DV | MPEG-2 |
|---|---|---|
| Frame Types | I frames only | I, P and B frames |
| Data Structure | Interleaved | Raster-Scan |
| Color Format | 4:1:1 (NTSC), 4:2:0 (PAL) | 4:2:0 |
| DCT types | Frame 8 × 8 and 2-4 × 8 | Field or frame 8 × 8 |

From the descriptions of the DV decoding and MPEG-2 encoding, it can be appreciated that numerous similarities exist between the formats. This is particularly true for MPEG-2 sequences encoded with a high occurrence of I frames. The embodiments of the invention perform efficient transcoding by utilizing these similarities to avoid having to decode the DV bitstream to the spatial domain before performing the MPEG-2 encoding.

By comparing the block flow diagrams depicting the DV decoding process and the MPEG-2 encoding of intrablocks, it can be appreciated that both formats operate on DCT coefficient data. While the various forms of the DCT data are not always identical, frame 8×8 DCT is common to both formats. Also, the 4:2:0 color format is common to both coding methods. Therefore, the embodiments of the invention define frame 8×8 DCT coefficients in the 4:2:0 color format to be an intermediate exchange format used by transcoder 217 (shown in FIG. 3). DV decoder 218 (shown in FIG. 3) will receive DV encoded signals and decode the signals to DCT coefficients. Transformer 222 transforms the DCT coefficients into an intermediate exchange format. MPEG encoder 220 (shown in FIG. 3) will then consume this data and generate MPEG encoded signals. Operating on the intermediate data alleviates the need for IDCT in the DV decoder and the forward DCT in the MPEG encoder, thereby greatly reducing the computational complexity of transcoder 217.

Figure 6:
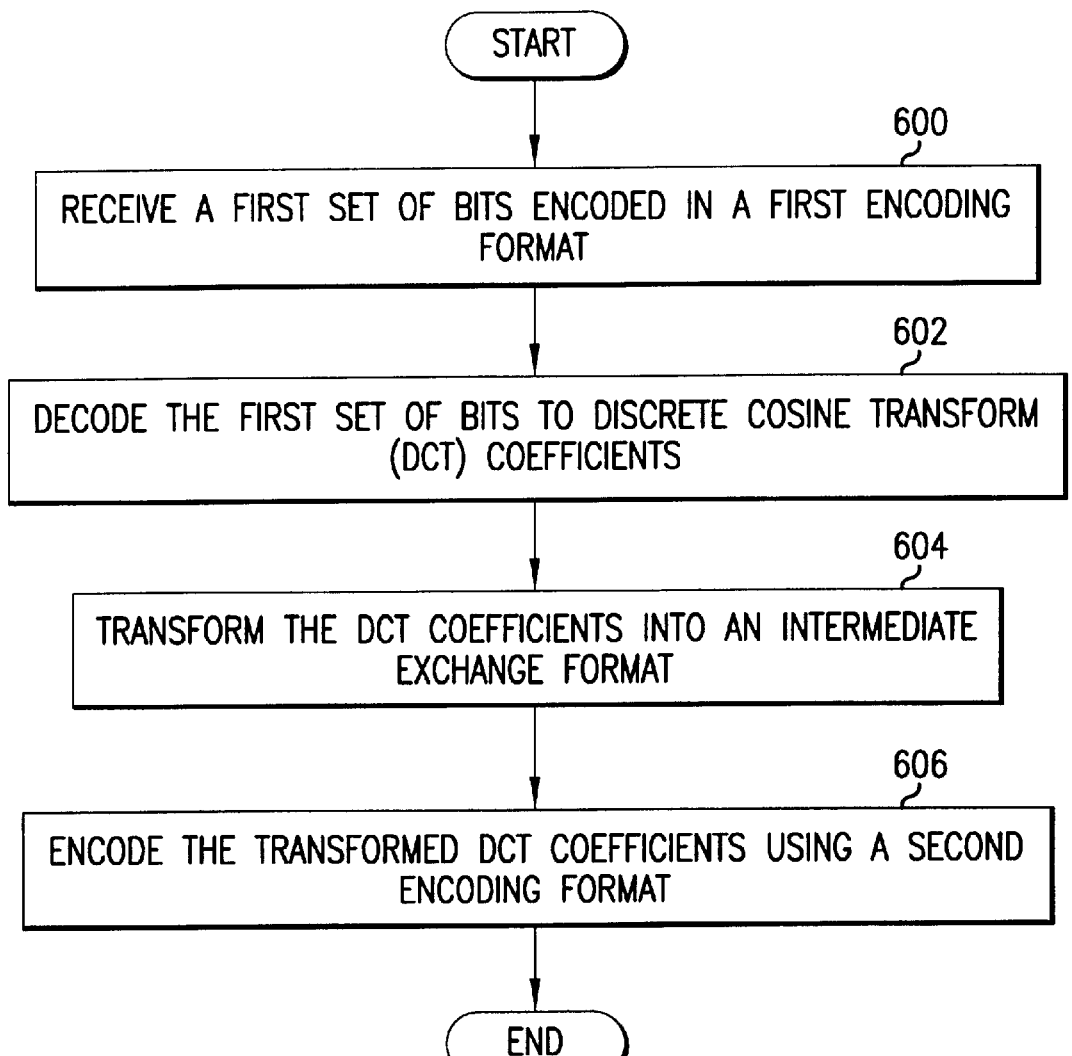
FIG. 6 is a block flow diagram of the steps performed by a transcoder in accordance with one embodiment of the invention.

FIG. 6 is a block flow diagram of the steps performed by a transcoder in accordance with one embodiment of the invention. A DV encoded bitstream is received by transcoder 217 at step 600. DV decoder 218 converts the DV encoded bitstream to DCT coefficients at step 602. Transformer 222 then transforms the DCT coefficients into an intermediate exchange format at step 604.

Transformer 222 performs four different transformations depending on the input data, which can take the following forms: (1) 8×8 luminance and PAL chrominance data; (2) 2–4×8 luminance and PAL chrominance data; (3) 8×8 NTSC chrominance data; and (4) 2–4×8 NTSC chrominance data. The first input data requires an identity transformation. The three others are implemented as sparse matrix multiplications. Once the transformation is performed, the block data is reordered and stored in raster-scan order to accommodate the MPEG-2 data structure.

Once the DCT coefficients are in the appropriate data structure, MPEG encoder 220 encodes the DCT coefficients into an MPEG encoded bitstream. In this embodiment of the invention, the DCT coefficients are converted to quantized coefficients. The quantized coefficients are then converted to VLE codes, which are sent out as an MPEG encoded bitstream.

If MPEG encoder 220 elects to use intracoding on the block, only the quantization and variable length encoding stages must be performed by DV decoder 218. If the block is intercoded, it is possible to perform motion estimation and compensation within the frequency domain. This, however, would limit the motion vector accuracy to multiples of 16. Motion vectors with finer accuracy may be needed to improve the coding efficiency. To accomplish this, DV decoder 218 may convert the blocks to the spatial domain using an inverse discrete cosine transform prior to motion estimation and compensation. MPEG encoder 220 can then encode the blocks back to the frequency domain using a discrete cosine transform prior to quantizing and variable length encoding the data.

It is worthy to note that although in the embodiments of the invention transformer 217 is implemented without run-length decoding or encoding, these functions can be incorporated into DV decoder 218 and MPEG encoder 220, respectively, and still fall within the scope of the invention. Further, a transformer performing additional steps to those described above also falls within the scope of the invention as long as the transformer is capable of transcoding data in the frequency domain in accordance with the principles described herein.

As stated previously, transformer 604 performs four different transforms depending upon the type of input data it receives. Each transform will be described herein in mathematical terms. It should be appreciated, that a person of ordinary skill in the art would be capable of implementing each transform in hardware, software or a combination of both, in accordance with the mathematical representations described herein.

The four different transforms assume the following definitions. The N×N discrete cosine transform matrix, $A_N$, is given by $$A_N(k,n) = \begin{cases} \dfrac{1}{\sqrt{N}}, & k = 0, \quad 0 \le n \le N-1 \\ \sqrt{\dfrac{2}{N}} \cos\dfrac{\pi(2n+1)k}{2N}, & 1 \le k \le N-1, \quad 0 \le n \le N-1 \end{cases} \quad (1)$$

The one-dimensional DCT of an N×1 column vector is calculated by pre-multiplying the vector by this matrix. The 1-D inverse DCT is obtained by pre-multiplying the result by the transpose, $A_N^t$. The DCT is real and orthogonal, so $A_N^{-1} = A_N^t$.

Let X represent an N×N block of pixels in the spatial domain. The 2-D DCT representation of this block is given by $$Y = A_N X A_N^t \quad (2)$$

Conversely, the spatial representation can be calculated from the DCT coefficients with $$X = A_N^t Y A_N \quad (3)$$

Finally, let $Z_N$ represent an N×N matrix of zeros, and let $I_N$ represent an N×N identity matrix (i.e., all zeros except for ones along the diagonal).

Transformation 1

For all luminance blocks and all PAL chrominance blocks that were DV encoded in 8×8 DCT mode, the transformation to the intermediate exchange format is merely the identity matrix $I_8$. Therefore, after inverse weighting the DCT data can be stored directly.

Transformation 2

For all luminance blocks and all PAL chrominance blocks that were DV encoded in 2–4×8 DCT mode, the two blocks of 4×8 DCT coefficients must be transformed into 8×8 DCT coefficients. Let $Y_1$ be the top 4×8 block and $Y_2$ the bottom 4×8 block. The following process restores the interlaced 8×8 spatial block:

$$X = \begin{bmatrix} 1 & 0 & 0 & 0 & 0 & 0 & 0 & 0 \\ 0 & 0 & 0 & 0 & 1 & 0 & 0 & 0 \\ 0 & 1 & 0 & 0 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 0 & 0 & 1 \end{bmatrix} \begin{bmatrix} \dfrac{1}{\sqrt{2}} A_4^T & \dfrac{1}{\sqrt{2}} A_4^T \\ \dfrac{1}{\sqrt{2}} A_4^T & -\dfrac{1}{\sqrt{2}} A_4^T \end{bmatrix} \begin{bmatrix} Y_1 \\ Y_2 \end{bmatrix} A_8 \quad (4)$$

The desired frame 8×8 DCT data is then given by $W = A_8 X A_8^t$. Combining these simplifies to $$W = T \begin{bmatrix} Y_1 \\ Y_2 \end{bmatrix} \quad (5)$$

$$T = \begin{bmatrix} 0.0000 & 0.0000 & 0.0000 & 0.0000 & 0.0000 & 0.0000 & 0.0000 & 0.0000 \\ 0.0000 & 0.9808 & 0.0000 & 0.0000 & 0.1802 & 0.0000 & -0.0747 & 0.0000 \\ 0.0000 & 0.0000 & 0.9239 & 0.0000 & 0.0000 & 0.3536 & 0.0000 & -0.1465 \\ 0.0000 & 0.0000 & 0.0000 & 0.8314 & 0.2126 & 0.0000 & 0.5132 & 0.0000 \\ 0.0000 & 0.0000 & 0.0000 & 0.0000 & 0.0000 & 0.3827 & 0.0000 & 0.9239 \\ 0.0000 & 0.0000 & 0.0000 & -0.5556 & 0.3182 & 0.0000 & 0.7682 & 0.0000 \\ 0.0000 & 0.0000 & -0.3827 & 0.0000 & 0.0000 & 0.8536 & 0.0000 & -0.3536 \\ 0.0000 & -0.1950 & 0.0000 & 0.0000 & 0.9061 & 0.0000 & -0.3753 & -0.0000 \end{bmatrix} \quad (6)$$

Transformation 3

For all NTSC chrominance blocks that were DV encoded in 8×8 DCT mode, two vertically adjacent 8×8 blocks must be transformed into two horizontally adjacent 8×8 blocks.

This transformation entails a vertical subsampling and a horizontal upsampling. The vertical downsampling is performed on each field and can be represented with the following matrix in the spatial domain:

$$V = 0.25 \begin{bmatrix} 3 & 0 & 1 & 0 & 0 & 0 & 0 & 0 & 0 & 0 & 0 & 0 & 0 & 0 & 0 & 0 \\ 0 & 1 & 0 & 3 & 0 & 0 & 0 & 0 & 0 & 0 & 0 & 0 & 0 & 0 & 0 & 0 \\ 0 & 0 & 0 & 0 & 3 & 0 & 1 & 0 & 0 & 0 & 0 & 0 & 0 & 0 & 0 & 0 \\ 0 & 0 & 0 & 0 & 0 & 1 & 0 & 3 & 0 & 0 & 0 & 0 & 0 & 0 & 0 & 0 \\ 0 & 0 & 0 & 0 & 0 & 0 & 0 & 0 & 3 & 0 & 1 & 0 & 0 & 0 & 0 & 0 \\ 0 & 0 & 0 & 0 & 0 & 0 & 0 & 0 & 1 & 0 & 3 & 0 & 0 & 0 & 0 & 0 \\ 0 & 0 & 0 & 0 & 0 & 0 & 0 & 0 & 0 & 0 & 0 & 0 & 3 & 0 & 1 & 0 \\ 0 & 0 & 0 & 0 & 0 & 0 & 0 & 0 & 0 & 0 & 0 & 0 & 1 & 0 & 3 \end{bmatrix} \quad (7)$$

Similarly, the horizontal upsampling can be represented by the following matrix in the spatial domain:

$$H = \begin{bmatrix} 1 & 1 & 0 & 0 & 0 & 0 & 0 & 0 & 0 & 0 & 0 & 0 & 0 & 0 & 0 & 0 \\ 0 & 0 & 1 & 1 & 0 & 0 & 0 & 0 & 0 & 0 & 0 & 0 & 0 & 0 & 0 & 0 \\ 0 & 0 & 0 & 0 & 1 & 1 & 0 & 0 & 0 & 0 & 0 & 0 & 0 & 0 & 0 & 0 \\ 0 & 0 & 0 & 0 & 0 & 0 & 1 & 1 & 0 & 0 & 0 & 0 & 0 & 0 & 0 & 0 \\ 0 & 0 & 0 & 0 & 0 & 0 & 0 & 0 & 1 & 1 & 0 & 0 & 0 & 0 & 0 & 0 \\ 0 & 0 & 0 & 0 & 0 & 0 & 0 & 0 & 0 & 0 & 1 & 1 & 0 & 0 & 0 & 0 \\ 0 & 0 & 0 & 0 & 0 & 0 & 0 & 0 & 0 & 0 & 0 & 0 & 1 & 1 & 0 & 0 \\ 0 & 0 & 0 & 0 & 0 & 0 & 0 & 0 & 0 & 0 & 0 & 0 & 0 & 0 & 1 & 1 \end{bmatrix} \quad (8)$$

Let Y1 be the top 8×8 DCT block and Y2 the bottom 8×8 DCT block. The following process can be to used to convert the two vertically adjacent 8×8 DCT blocks into two horizontally 8×8 spatial blocks:

$$[X_1 \ X_2] = V \begin{bmatrix} A_8^t & Z_8 \\ Z_8 & A_8^t \end{bmatrix} \begin{bmatrix} Y_1 & Z_8 \\ Z_8 & Y_2 \end{bmatrix} \begin{bmatrix} A_8 \\ A_8 \end{bmatrix} H \quad (9)$$

The desired two horizontally adjacent 8×8 DCT blocks are then given by $$[W_1 \ W_2] = A_8 [X_1 \ X_2] \begin{bmatrix} A_8^t & Z_8 \\ Z_8 & A_8^t \end{bmatrix} \quad (10)$$

Combining and simplifying yields
$$[W_1 W_2] = [F_1 Y_1 B_1 30 \ F_2 Y_2 B_1 F_1 Y_1 B_2 + F_2 Y_2 B_2] \quad (11)$$

$$F_1 = \begin{bmatrix} 0.5000 & 0.0000 & 0.0000 & 0.0000 & 0.2500 & 0.0000 & 0.0000 & 0.0000 \\ 0.4531 & 0.1962 & -0.0315 & 0.0422 & 0.2265 & 0.1175 & -0.0273 & 0.0093 \\ 0.0000 & 0.4717 & 0.0000 & 0.0857 & 0.0000 & 0.2874 & 0.0000 & -0.0037 \\ -1.1591 & 0.3728 & 0.2168 & 0.0398 & -0.0795 & 0.2357 & 0.1880 & -0.0490 \\ 0.0000 & 0.0000 & 0.4223 & 0.0000 & 0.0000 & 0.0000 & 0.3663 & 0.0000 \\ 0.1063 & -0.1644 & 0.3244 & 0.1107 & 0.0532 & -0.1433 & 0.2814 & 0.2326 \\ 0.0000 & 0.0037 & 0.0000 & 0.2847 & 0.0000 & -0.0857 & 0.0000 & 0.4717 \\ -0.0901 & 0.1343 & -0.1585 & 0.2726 & -0.0451 & 0.0056 & -0.1375 & 0.4074 \end{bmatrix} \quad (12)$$

$$F_2 = \begin{bmatrix} 0.5000 & 0.0000 & 0.0000 & 0.0000 & 0.2500 & 0.0000 & 0.0000 & 0.0000 \\ -0.4531 & 0.1962 & 0.0315 & 0.0422 & -0.2265 & 0.1175 & 0.0273 & 0.0093 \\ 0.0000 & -0.4717 & 0.0000 & -0.0857 & 0.0000 & -0.2874 & 0.0000 & 0.0037 \\ 0.1591 & 0.3728 & -0.2168 & 0.0398 & 0.0795 & 0.2357 & -0.1880 & -0.0490 \\ 0.0000 & 0.0000 & 0.4223 & 0.0000 & 0.0000 & 0.0000 & 0.3663 & 0.0000 \\ -0.1063 & -0.1644 & -0.3244 & 0.1107 & -0.0532 & -0.1433 & -0.2814 & 0.2326 \\ 0.0000 & -0.0037 & 0.0000 & -0.2847 & 0.0000 & 0.0857 & 0.0000 & -0.4717 \\ 0.0901 & 0.1343 & 0.1585 & 0.2726 & 0.0451 & 0.0056 & 0.1375 & 0.4074 \end{bmatrix} \quad (13)$$

$$B_2 = \begin{bmatrix} 1.0000 & 0.0000 & 0.0000 & 0.0000 & 0.0000 & 0.0000 & 0.0000 & 0.0000 \\ 0.9061 & 0.4077 & 0.0690 & 0.0190 & 0.0000 & -0.0127 & -0.0286 & -0.0811 \\ 0.0000 & -0.9808 & 0.0000 & 0.0000 & 0.0000 & 0.0000 & 0.0000 & 0.1951 \\ 0.3182 & 0.7759 & -0.4742 & -0.0811 & 0.0000 & 0.0542 & 0.1964 & -0.1543 \\ 0.0000 & 0.0000 & 0.9239 & 0.0000 & 0.0000 & 0.0000 & -0.3827 & 0.0000 \\ -0.2126 & -0.3457 & -0.7097 & 0.4077 & 0.0000 & -0.2724 & 0.2940 & 0.0688 \\ 0.0000 & 0.0000 & 0.0000 & -0.8315 & 0.0000 & 0.5556 & 0.0000 & 0.0000 \\ 0.1802 & 0.2724 & 0.3468 & 0.7198 & 0.0000 & -0.4810 & -0.1436 & -0.0542 \end{bmatrix} \quad (15)$$

-continued $$B_1 = \begin{bmatrix} 1.0000 & 0.0000 & 0.0000 & 0.0000 & 0.0000 & 0.0000 & 0.0000 & 0.0000 \\ 0.9061 & 0.4077 & -0.0690 & 0.0190 & 0.0000 & -0.0127 & 0.0286 & -0.0811 \\ 0.0000 & 0.9808 & 0.0000 & 0.0000 & 0.0000 & 0.0000 & 0.0000 & -0.1951 \\ -0.3182 & 0.7759 & 0.4742 & -0.0811 & 0.0000 & 0.0542 & -0.1964 & -0.1543 \\ 0.0000 & 0.0000 & 0.9239 & 0.0000 & 0.0000 & 0.0000 & -0.3827 & 0.0000 \\ 0.2126 & -0.3457 & 0.7097 & 0.4077 & 0.0000 & -0.2724 & -0.2940 & 0.0688 \\ 0.0000 & 0.0000 & 0.0000 & 0.8315 & 0.0000 & -0.5556 & 0.0000 & 0.0000 \\ -0.1802 & 0.2724 & -0.3468 & 0.7198 & 0.0000 & 0.4810 & 0.1436 & -0.0542 \end{bmatrix} \quad (14)$$

Transformation 4

For all NTSC chrominance blocks that were DV encoded in 2–4×8 DCT mode, the transformation must convert from 4:1:1 to 4:2:0 and to 8×8 DCT coefficients. This can be accomplished by essentially combining the two prior transformations. In particular, Equation (11) is used with $F_1$ replaced by the matrix given in Equation (16) if $Y_1$ was encoded in 2–4×8 DCT mode. Similarly, if $Y_2$ was encoded in 2–4×8 mode, $F_2$ is replaced by the matrix given in Equation (17).

$$F_1 = \begin{bmatrix} 0.5000 & 0.0000 & 0.0000 & 0.0000 & 0.0000 & 0.0957 & 0.0000 & 0.2310 \\ 0.4531 & 0.1906 & -0.0187 & -0.0302 & 0.0901 & 0.0522 & 0.0938 & 0.2236 \\ 0.0000 & 04634 & 0.0000 & -0.0884 & 0.1913 & 0.0000 & 0.2310 & 0.0000 \\ -0.1591 & 0.3752 & 0.1283 & -0.0979 & 0.1063 & 0.2067 & 0.1920 & -0.1717 \\ 0.0000 & 0.0000 & 0.2500 & 0.0000 & 0.0000 & 0.4619 & 0.0000 & -0.1913 \\ 0.1063 & -0.2067 & 0.1920 & 0.1717 & 0.1591 & 0.3752 & -0.1283 & 0.0979 \\ 0.0000 & -0.0884 & 0.0000 & 0.2866 & 0.4619 & 0.0000 & -0.0957 & 0.0000 \\ -0.0901 & 0.0522 & -0.0938 & 0.2236 & 0.4531 & -0.1906 & -0.0187 & 0.0302 \end{bmatrix} \quad (16)$$

$$F_2 = \begin{bmatrix} 0.5000 & 0.0000 & 0.0000 & 0.0000 & 0.0000 & 0.0957 & 0.0000 & 0.2310 \\ -0.4531 & 0.1906 & 0.0187 & -0.0302 & 0.0901 & -0.0522 & 0.0938 & -0.2236 \\ 0.0000 & -0.4634 & 0.0000 & 0.0884 & -0.1913 & 0.0000 & -0.2310 & 0.0000 \\ 0.1591 & 0.3752 & -0.1283 & -0.0979 & 0.1063 & -0.2067 & 0.1920 & 0.1717 \\ 0.0000 & 0.0000 & 0.2500 & 0.0000 & 0.0000 & 0.4619 & 0.0000 & -0.1913 \\ -0.1063 & -0.2067 & -0.1920 & -0.1717 & 0.1591 & -0.3752 & -0.1283 & 0.0979 \\ 0.0000 & 0.0884 & 0.0000 & -0.2866 & -0.4619 & 0.0000 & 0.0957 & 0.0000 \\ 0.0901 & 0.0522 & 0.0938 & 0.2236 & 0.4531 & 0.1906 & -0.0187 & -0.0302 \end{bmatrix} \quad (17)$$

Although various embodiments are specifically illustrated and described herein, it will be appreciated that modifications and variations of the present invention are covered by the above teachings and within the purview of the appended claims without departing from the spirit and intended scope of the invention.

What is claimed is:

1. A method for transcoding a digital video signal, comprising:
   receiving a first set of bits encoded in a first encoding format;
   decoding said first set of bits to discrete cosine transform (DCT) coefficients;
   transforming said DCT coefficients into an intermediate exchange format; and
   encoding said transformed DCT coefficients using a second encoding format; wherein
   said intermediate exchange format comprises a data structure having a first DCT mode and first color format, and wherein said transforming includes determining whether said DCT coefficients were created with said DCT mode and said first color format; and
   transforming said DCT coefficients to match said DCT mode and said first color format in accordance with said determination.

2. The method of claim 1, wherein said first encoding format is a digital video (DV) encoding format, and wherein said second encoding format is a motion picture experts group (MPEG) encoding format.

3. The method of claim 2, wherein said DCT coefficients were created with an 8×8 DCT mode for luminance and PAL chrominance blocks, and wherein said transforming said DCT coefficients to match said first DCT mode and said first color format comprises multiplying said DCT coefficients with values stored by an identity matrix.

4. The method of claim 2, wherein said DCT coefficients were created with a two blocks of 4×8 DCT mode for luminance and PAL chrominance blocks, and wherein said transforming said DCT coefficients to match said first DCT mode and said first color format comprises converting said DCT coefficients to an interlaced 8×8 spatial block in accordance with an equation W=T[Y1 over Y2].

5. The method of claim 2, wherein said DCT coefficients were created with an 8×8 DCT mode for NTSC chrominance blocks, and wherein said transforming said DCT coefficients to match said DCT mode and said first color format comprises converting two vertically adjacent 8×8 blocks into two horizontally adjacent 8×8 blocks in accordance with an equation [W1 W2]=[F1Y1B1+F2Y2B1 F1Y1B2+F2Y2B2].

6. The method of claim 2, wherein said DCT coefficients were created with a two blocks of 4×8 DCT mode for NTSC chrominance blocks, and wherein said transforming said DCT coefficients to match said DCT mode and said first color format comprises converting said DCT coefficients from 4:1:1 to 4:2:0 and to 8×8 DCT coefficients in accordance with an equation [W1 W2]=[F1Y1B1+F2Y2B1 F1Y1B2+F2Y2B2].

7. The method of claim 1, wherein said decoding comprises:
- converting said bits to a first set of variable length encoded (VLE) codes;
- converting said first set of VLE codes to a first set of quantized coefficients; and
- converting said first set of quantized coefficients to said DCT coefficients.

8. The method of claim 1, wherein said encoding comprises:
- converting DCT coefficients to a second set of quantized coefficients;
- converting said second set of quantized coefficients to a second set of VLE codes; and
- converting said second set of VLE codes into a second set of bits.

9. A machine-readable medium whose contents cause a system to transcode a digital video signal, by performing the steps of:
- receiving a first set of bits encoded in a first encoding format;
- decoding said first set of bits to discrete cosine transform (DCT) coefficients;
- transforming said DCT coefficients into an intermediate exchange format; and
- encoding said transformed DCT coefficient using a second encoding format; wherein
  - said intermediate exchange format comprises a data structure having a first DCT mode and first color format, and wherein said transforming comprises
    - determining whether said DCT coefficients were created with said DCT mode and said first color format; and
    - transforming said DCT coefficients to match said DCT mode and said first color format accordance with said determination.

10. The machine-readable medium of claim 9, wherein said first encoding format is a digital video (DV) encoding format, and wherein said second encoding format is a motion picture experts group (MPEG) encoding format.

11. The machine-readable medium of claim 10, wherein said DCT coefficients were created with an 8×8 DCT mode for luminance and PAL chrominance blocks, and wherein said transforming said DCT coefficients to match said first DCT mode and said color format comprises multiplying said DCT coefficients with values stored by and identity matrix.

12. The machine-readable medium of claim 10, wherein said DCT coefficients were created with a two blocks of 4×8 DCT mode for luminance and PAL chrominance blocks, and wherein said transforming said DCT coefficients to match said first DCT mode and said first color format comprises converting said DCT coefficients to an interlaced 8×8 spatial block in accordance with an equation W=T[Y1 over Y2].

13. The machine-readable medium of claim 10, wherein said DCT coefficients were created with an 8×8 DCT mode for NTSC chrominance blocks, and wherein said transforming said DCT coefficients to match said DCT mode and said first color format comprises converting two vertically adjacent 8×8 blocks into two horizontally adjacent 8×8 blocks in accordance with an equation [W1 W2]=[F1Y1B1+F2Y2B1 F1Y1B2+F2Y2B2].

14. The machine-readable medium of claim 10, wherein said DCT coefficients were created with a two blocks of 4×8 DCT mode for NTSC chrominance blocks, and wherein said transforming said DCT coefficients to match said DCT mode and said first color format comprises converting said DCT coefficients from 4:1:1 to 4:2:0 and to 8×8 DCT coefficients in accordance with an equation [W1 W2]=[F1Y1B1+F2Y2B1 F1YB2+F2Y2B2].

15. The machine-readable medium of claim 9, wherein said decoding comprises:
- converting said bits to a first set of variable length encoded (VLE) codes;
- converting said first set of VLE codes to a first set of quantized coefficients; and
- converting said first set of quantized coefficients to said DCT coefficients.

16. The machine-readable medium of claim 9, wherein said encoding comprises:
- converting DCT coefficients to a second set of quantized coefficients;
- converting said second set of quantized coefficients to a second set of VLE codes; and
- converting said second set of VLE codes into a second set of bits.

17. An apparatus transcoding a first set of bits encoded using a first format into a second set of bits encoded using a second format, comprising;
- a decoder, said decoder having a first input capable of receiving the first set of bits and of encoding them into discrete cosine transform (DCT) coefficients, with said decoder having a first output;
- a transcoder having a second input coupled to said first output, said transcoder capable of receiving said DCT coefficients and of transforming them into an intermediate exchange format, said transcoder having a second input; and
- an encoder having a third input coupled to said second output, said encoder capable of receiving said transformed DCT coefficients and of encoding them using the second encoding format; wherein
  - said intermediate exchange format comprises a data structure having a first DCT mode and first color format, and wherein said transforming comprises
    - determining whether said DCT coefficients were created with said DCT mode and said first color format; and
    - transforming said DCT coefficients to match said DCT mode and said first color format in accordance with said determination.

18. A transcoding system, comprises:
- a first encoder;
- a decoder operably coupled to said first encoder;
- a transcoder operably coupled to said decoder, said transcoder capable of receiving DCT coefficients from said decoder and of transforming them into an intermediate exchange format;
- a second encoder operably coupled to said transcoder
  - said intermediate exchange format comprises a data structure having a first DCT mode and first color format, and wherein said transforming comprises
    - determining where said DCT coefficients were created with said DCT mode and said first color format; and
    - transforming said DCT coefficients to match said DCT mode and said first color format in accordance with said determination.

19. The system of claim 18, further comprising a DVD writer operably coupled to said second encoder.

* * * * *